Figures 1, 2:
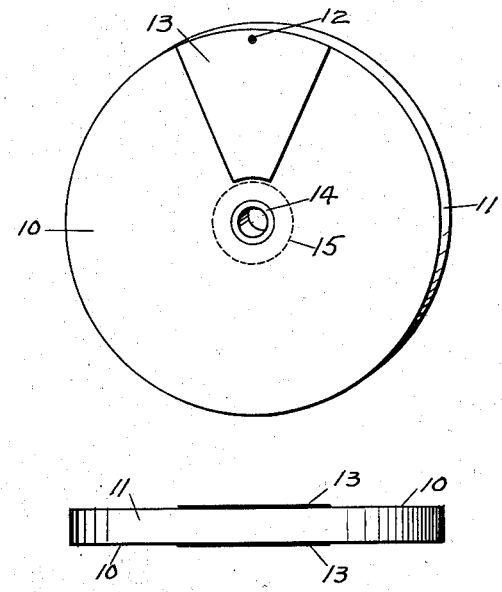

Jan. 1, 1935.  H. R. SIMONDS  1,986,648

ABRASIVE WHEEL

Original Filed Jan. 24, 1931

Inventor
Herbert R. Simonds,
By Fassett and Fassett.
Attorneys.

Patented Jan. 1, 1935

1,986,648

UNITED STATES PATENT OFFICE 1,986,648

ABRASIVE WHEEL

Herbert R. Simonds, Dayton, Ohio, assignor to Simonds Worden White Company, Dayton, Ohio, a corporation of Ohio Application January 24, 1931, Serial No. 511,040
Renewed October 16, 1934

8 Claims. (Cl. 51—169)

This invention relates to abrasive wheels and the like, and particularly to methods of balancing such wheels to prevent their vibrating when rotated at high velocities.

Nothwithstanding numerous methods have been devised for the purpose of producing abrasive wheels that do not require balancing a large percentage of the wheels made are out of balance, and require at least some counterweighting to balance them. Balancing abrasive wheels has always been a difficult problem, and until now there has been no practical method of balancing wheels other than the use of weights close to their axes.

Abrasive wheels are made of granular abrasive material, such as silicon carbide or aluminous oxide, which may be bonded with various materials, such as vitreous clays, shellac or synthetic resins. Abrasive wheels are more or less porous, the porosity depending principally upon the size of the grains of abrasive material used, the smaller the grains the less the porosity. While my invention is applicable to wheels of other grades, it is more particularly adapted to balancing wheels of low porosity.

I shall now describe my invention in detail, with the aid of the accompanying drawing, in which:

Fig. 1 depicts an abrasive wheel of a well known form, balanced by my method, and Fig. 2 is a view of the wheel looking directly at its edge.

For the purposes of this application I shall call the flat surfaces of the wheel, indicated at 10—10, the faces of the wheel, and the periphery 11 will be called its edge. At its center the wheel is provided with a bushing 14, usually made of lead. As methods of determining which is the light and which the heavy side of a wheel, and for determining when the wheel is in balance, are well known, it is not necessary to describe any such method. Having determined that the dot 12 near the edge of the wheel in Fig. 1 marks the center of gravity of the light side of the wheel, and that a lump of clay weighing one-half ounce stuck to its edge just balances the wheel, I proceed in the following manner to balance the wheel permanently.

I lay out a sector of suitable size on one or both faces of the wheel, with the lightest point, indicated by the dot 12, in the center. Then I give the sectors a coat of paint, indicated at 13. The term "paint" is here used in a broad sense; that is, meaning incrusting or covering the surface with a hard coat of material which will adhere thereto. There are various paints and varnishes that can be used for this purpose, but I prefer a varnish made of a gum-resin reduced to fluidity with naphtha. In Fig. 2 this coating is shown somewhat exaggerated in thickness. After the paint has dried I give the entire face, or faces, of the wheel a uniform coat of paint. This is not necessary, however, as it merely conceals the painted sectors and improves the appearance of the wheel.

The purpose of painting the sectors is to increase the weight of the light side to equality with the weight of the heavy side, and thereby balance the wheel. The final coat, being uniform over the whole facial surface, does not upset the balance. The size of the painted sector may be varied according to the amount of weight it is necessary to add to the light side of the wheel. That is, if it is necessary to add considerable weight I make the sector large; if less weight is needed I make the sector proportionately smaller. While there are numerous paints and varnishes that can be used for this purpose, it is important to use only such as contain nothing which might affect the bonding material in the wheel.

As is well known, abrasive wheels are mounted on shafts which are rotated at high velocities, and a wheel is usually clamped between a face plate, rigidly fixed to the shaft, and a loose plate of the same diameter as the fixed plate, the latter plate being forced toward the fixed plate by a nut screwed on the shaft. While the sectors are not ordinarily as thick as they are shown in Fig. 2, they do have some thickness. The thickness of the sectors, like their area, may be varied according to the amount of weight it is necessary to add to the light side of the wheel. One way of doing this is to vary the consistency of the paint. Another way is to apply a plurality of coats of paint in the sectoral areas. As the sectors might, because of their thickness, prevent the proper seating of the clamping plates, and even tilt the wheel and cause it to wabble, I prefer to curtail the sectors so they do not extend under the plates. This is illustrated in Fig. 1, where the dotted circle 15 indicates the position of the periphery of a clamping plate. It will be seen that at its inner edge the sector 13 misses the circle 15 and it would not interfere with proper seating of the clamping plate. Of course, if desired the sector could be extended to the bushing 14.

I have previously said that abrasive wheels are more or less porous, and that the present method of balancing wheels is especially applicable to wheels of low porosity. In my pending application, Serial No. 509,694 I have described and claimed a method of balancing abrasive wheels which consists in introducing some substance into the pores of the wheel on the light side of its axis. That method is especially adapted to use on wheels of high porosity; that is, wheels with large pores or foramina. In said application I have also claimed an abrasive wheel which is balanced by some substance lodged in its pores. In the practice of the present method there may be more or less absorption of the paint into the interior of the wheel, depending upon the absorbtivity (porosity) of the wheel and the consistence of the paint, and the paint absorbed becomes a part of the counterweight. But as some wheels are so unabsorptive as to permit of little or no penetration of paint applied to its exterior, the present invention depends principally upon the weight of the paint remaining on the outside of the wheel in the sectoral areas.

One of the advantages of balancing wheels by the present method is that the wheels remain in balance as they gradually become smaller through wear. While I have only described my invention in connection with an ordinary straight wheel it is plain that the invention is applicable to wheels of other shapes. If the amount of weight needed to balance a wheel is determined by sticking a lump of clay or other material to the edge of the wheel it will require more weight in the sectors than the weight of the lump of clay, because the weight in the sectors is closer to the axis of the wheel, the difference depending upon the diameter of the wheel. This difference can be determined mathematically or empirically. At first a workman may get too little or too much paint on a wheel, and have to add some paint to the sectors, or put some on the opposite side, formerly the heavy side, as the case may be. But he will very soon acquire skill and judgment which will enable him to balance the wheel in the first treatment, and he will seldom have to resort to a second treatment.

Having fully described my invention and the preferred manner of practicing it, I claim:

1. An abrasive wheel which is balanced by a sectoral coat of paint applied to one or both faces on the light side of the wheel.

2. An abrasive wheel which is balanced by a sectoral coat of paint applied to one or both faces on the light side of the wheel, said coats of paint being curtailed on their inner ends on a line farther from the axis of the wheel than will be the peripheries of clamping plates used in mounting the wheel on a shaft.

3. An abrasive wheel which is balanced with paint applied to a sectoral area of one or both faces on the light side of the wheel, a portion of said paint being in the pores of the wheel and a portion being on the facial surface thereof.

4. An abrasive wheel which is balanced with paint applied to a sectoral area of one or both faces on the light side of the wheel, a small portion of said paint being in the pores of the wheel, but the greater portion being on the facial surface thereof.

5. An abrasive wheel of low porosity which is balanced with paint applied to a limited area of one or both faces of the wheel, on its light side, the major portion of the paint being on the facial surface of the wheel.

6. An abrasive wheel which is balanced with a coat of paint applied in a limited area of one or both faces, on its light side.

7. An abrasive wheel which is balanced by a sectoral coat of some substance applied in a liquid state to one or both faces on the light side of the wheel.

8. An abrasive wheel which is balanced with a coat of some substance applied in a liquid state to a limited area of one or both faces, on its light side.

HERBERT R. SIMONDS.